United States Patent
Benson

(10) Patent No.: US 6,424,542 B1
(45) Date of Patent: Jul. 23, 2002

(54) RETAINER FOR PC CARD AND METHOD

(75) Inventor: Thomas R. Benson, Seattle, WA (US)

(73) Assignee: Intermec IP Corp., Beverly Hills, CA (US)

(*) Notice: Subject to any disclaimer, the term of this patent is extended or adjusted under 35 U.S.C. 154(b) by 0 days.

(21) Appl. No.: 09/182,341

(22) Filed: Oct. 29, 1998

(51) Int. Cl.[7] .............................................. H05K 7/14
(52) U.S. Cl. .................... 361/798; 361/759; 361/801; 439/328
(58) Field of Search .............................. 361/736, 737, 361/740, 741, 747, 752, 754, 756, 759, 787, 798, 801, 802; 439/153, 324, 325, 328, 157–160

(56) References Cited

U.S. PATENT DOCUMENTS

| | | | | |
|---|---|---|---|---|
| 4,838,804 A | * | 6/1989 | Banjo et al. | 439/325 |
| 5,831,820 A | * | 11/1998 | Huang | 361/686 |
| 5,879,175 A | * | 3/1999 | Muramatsu et al. | 439/159 |

FOREIGN PATENT DOCUMENTS

| | | | |
|---|---|---|---|
| JP | 410134888 A | * | 5/1998 |
| JP | 411040290 A | * | 2/1999 |

* cited by examiner

Primary Examiner—Albert W. Paladini
Assistant Examiner—Tuan Dinh
(74) Attorney, Agent, or Firm—Joan H. Pauly

(57) ABSTRACT

A PC card holder is mounted on a circuit board. A card retainer is mounted adjacent to the holder to prevent unintentional movement of a card out of an engaged position in the holder when the holder is subjected to vibrations. The retainer preferably includes a finger having a hook formed on a free end thereof that is yieldably biased into a blocking position in which it blocks the unintentional movement. An outer end surface of the hook engages a front corner portion of the card. When the card is being intentionally removed from the holder, movement of the card deflects the finger to allow passage of the card. Similarly, insertion of a card into the holder deflects the finger into a nonblocking position.

18 Claims, 3 Drawing Sheets

US 6,424,542 B1

RETAINER FOR PC CARD AND METHOD

TECHNICAL FIELD

This invention relates to the retention of PC cards in card holders and, more particularly, to a system of preventing unintended disengagement by resiliently biasing a retainer into a pathway along which the card is removed from the holder.

BACKGROUND INFORMATION

PC cards are used in various types of electronic devices. Such devices include notebook computers and various types of devices for reading bar codes and other symbologies. The reading devices include scanners and digital cameras. In bar code scanners, bar code data may be stored in a compact flash card preparatory to transfer to a host computer. The transfer may occur by wireless communication, i.e. radio frequency communication, an infrared signal, or use of a modem. Digital cameras are sometimes used for reading two-dimensional symbologies, which are in effect a two-dimensional version of the standard one-dimensional bar code. Digital cameras are also used for broader purposes, such as high quality photography of subjects unrelated to bar codes.

Reading devices are frequently used in factory or warehouse environments where all or a portion of the reader, such as a computer or communications device, is mounted on a forklift or other vehicle or on a wall or other support structure that is subjected to vibrations. In the case of a vehicle mounting, the vibrations are due at least primarily to the operation of the vehicle. In the case of a support structure mounting, vibrations may be experienced because of the operation of machinery and other activity in the vicinity of the structure.

A problem that has been encountered in connection with the use of PC cards in environments subject to vibrations is the disruption of a reading or communication process caused by unintentional movement of a PC card out of position in its holder. Such movement disengages the card from a connector that electronically connects it to the system. If the unintended disconnection of the card occurs during a card memory writing process or the transmission of data, data may be lost. This results in the added expense of personnel time spent in recollecting the data. In some situations, it may not be possible to recollect the data. For example, in a warehouse environment, the data might include the identification of shipping units that have left the warehouse and are on their way to their destinations.

Currently available mounting mechanisms for PC cards have the drawback of not providing for protection against unintended disconnection of cards when the device is subjected to vibrations or similar disturbances. The conception of the present invention began with the applicant's recognition of the need for a mechanism that would prevent unintended disengagement of a card from its connector and also allow or facilitate removal of the card when removal is desired.

SUMMARY OF THE INVENTION

A subject of the invention is a device for retaining a PC card in an engaged position in a card holder that permits movement of the card out of the engaged position along a pathway. According to an aspect of the invention, the device comprises a retainer having a blocking portion biased to extend into the pathway to prevent unintentional movement of the card along the pathway out of the engaged position when the holder is subjected to vibrations. The retainer is yieldably biased to allow the blocking portion to be deflected out of the pathway for desired insertion or removal of a card. When it is desired to remove a card, a positive force may be deliberately applied to the card to move the card out of its engaged position. The movement of the card deflects the blocking portion. Similarly, movement of the card into the holder toward the engaged position deflects the blocking portion.

The retainer may be used in connection with a holder from which cards are removed manually. In such case, the positive force is applied directly by grasping and pulling on the card or by pushing the card. The retainer may also be used in connection with a card holder that has an ejector operable to move the card along the pathway from the engaged position to an ejected position. In such case, operation of the ejector and the resulting movement of the card deflects the blocking portion.

Whatever the manner of intended removal of the card from the holder, the retaining device may include a number of preferred features. Preferably, the blocking portion of the retainer engages a corner portion of the card to prevent unintentional movement of the card. Also preferably, the retainer comprises a resilient finger, and the blocking portion is provided by an end portion of the finger. In the preferred embodiment, the finger includes a main portion that extends substantially parallel to the pathway and has a first end mounted adjacent to the holder and an opposite second free end. A hook portion is carried by the second end. An outer end surface of the hook portion engages the corner portion of the card.

The material from which the finger is made and the configuration and mounting of the finger may be varied considerably. In the currently preferred embodiment, the finger is made from a flexible nylon material. It is anticipated that the card holder will normally be mounted on a circuit board. Preferably, the first end of the finger will be mounted on the board adjacent to the holder. For one type of holder, the preferred form of the retainer includes a bracket that is integral with the finger. The bracket extends around the holder and is secured to the circuit board by a plurality of fasteners. The fasteners also secure the holder to the board. This is an efficient and secure way of mounting the retainer.

Another subject of the invention is a method of preventing unintentional movement of a PC card along a pathway out of an engaged position in a card holder when the holder is subjected to vibrations. According to an aspect of the invention, the method comprises yieldably biasing a blocking portion of a retainer to extend into the pathway to prevent the unintentional movement. When it is desired to remove the card from the holder, a positive force is applied to the card to move the card out of the engaged position. The method includes allowing movement of the card to deflect the blocking portion out of the pathway. It also includes inserting a card into the holder and allowing movement of the card toward the engaged position to deflect the blocking portion out of the pathway.

Preferably, the method comprises positioning the retainer to engage a corner portion of a card in the engaged position. Also preferably, positioning the retainer comprises mounting a first end of a flexible finger adjacent to the holder, and positioning an end surface of a hook carried by an opposite second free end of the finger to engage the corner portion.

The apparatus and method of the invention solve the problem discussed above of unintended disengagement of a PC card from its connection to a system and consequent disruption of the symbology reading or other procedure being carried out by the system. The retainer of the invention provides a simple and cost effective means for preventing unintentional movement of the card. At the same time, the retainer in no way interferes with the normal procedures for inserting cards into their holders and removing the cards therefrom when removal is desired.

The advantages and features discussed above and other advantages and features will become apparent from the detailed description of the best mode for carrying out the invention that follows.

BRIEF DESCRIPTION OF THE DRAWINGS

In the drawings, like element designations refer to like parts throughout, and.

BEST MODE FOR CARRYING OUT THE INVENTION

Figure 1:
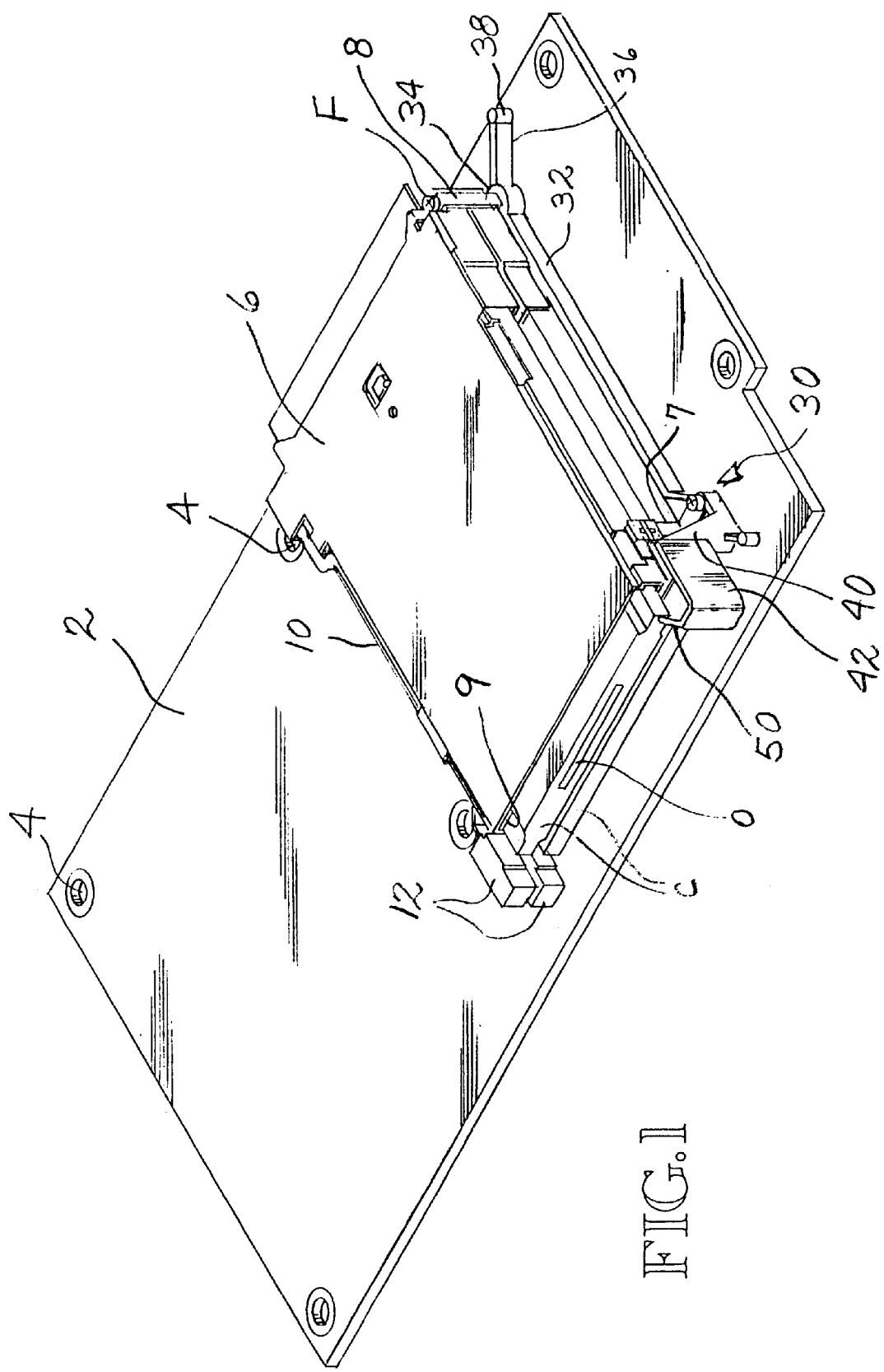
FIG. 1 is a pictorial view of the preferred embodiment of the invention mounted on a circuit board in association with a known type of card holder.

The drawings show a retainer 30 that is constructed according to the invention and that constitutes the best mode of the apparatus of the invention currently known to the applicant. The drawings also illustrate the best mode of the method of the invention currently known to the applicant. In the drawings, the retainer 30 is shown being used in association with a known type of card holder sometimes referred to as a cage 6. Both the cage 6 and the retainer 30 are mounted on a circuit board 2. It is anticipated that the device of the invention will be used primarily in a circuit board mounting such as that shown in FIGS. 1–3. However it is intended to be understood that the device of the invention may also be used in connection with other types of mountings and with card holders other than the cage 6 shown in FIGS. 1–3 without departing from the spirit and scope of the invention.

Figure 2:
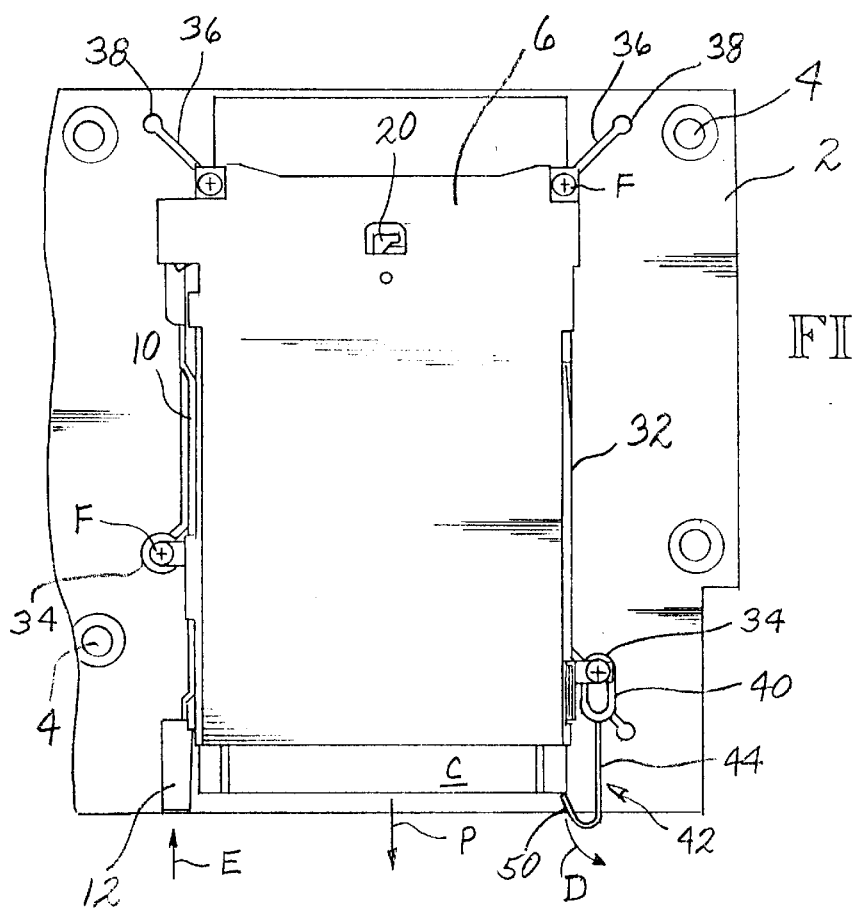
FIG. 2 is a plan view of the apparatus shown in FIG. 1.
Figure 3:
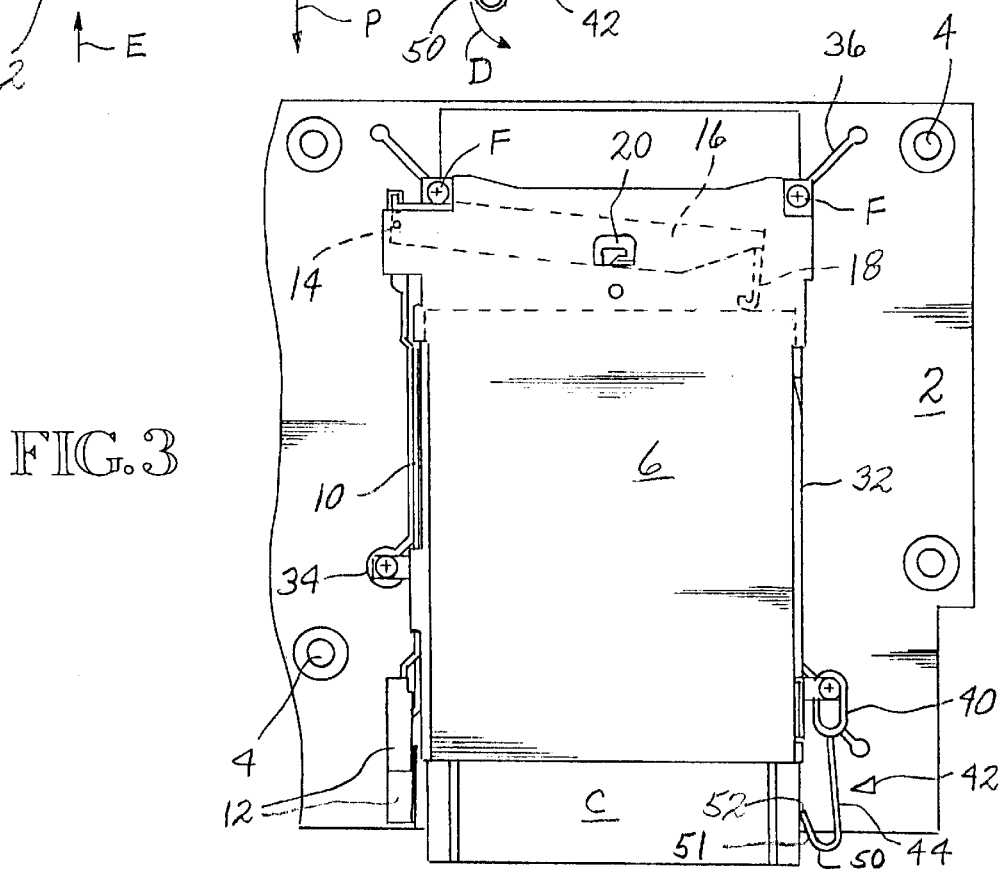
FIG. 3 is like FIG. 2 except that it shows the card in an ejected position.
Figure 4:
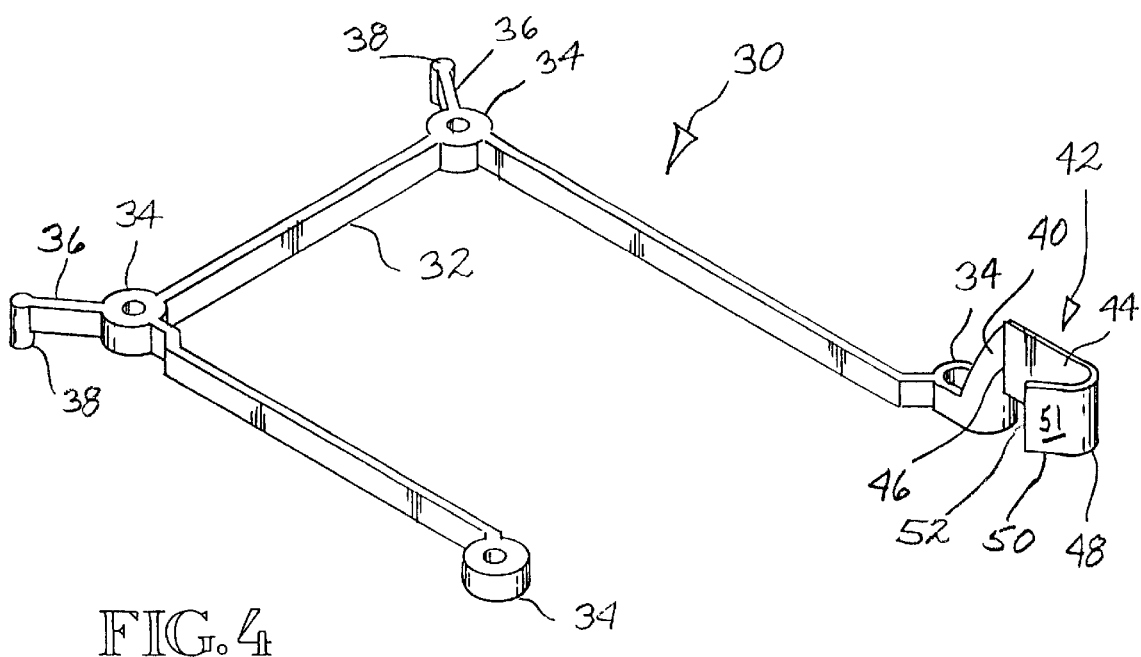
FIG. 4 is a pictorial view of the preferred embodiment of the retainer shown in FIGS. 1–3.

Referring to FIGS. 1–3, the board 2 has a number of holes 4 preformed therein for securing the board 2 to a housing or other support structure and/or for securing other components to the board 2. The card cage 6 is an example of another component that commonly is attached to the board 2. As shown, the cage 6 is attached by means of fasteners F that engage L-shaped brackets 7 and tubular lugs 8 on the cage 6.

The cage 6 has two parallel and adjacent slots 9 for receiving PC cards C. As shown in FIGS. 1 and 2, when a card C is in an engaged position in the cage 6, its outer end projects from the front of the cage 6. Its opposite inner end engages the prongs of a connector (not shown) to electronically connect the card to the system. FIG. 1 also illustrates an output connector 0 on the outer end of the upper card C (as shown) for receiving a cable connector or the like to connect the card C to further components of the system.

As noted above, the invention may be used with various types of card holders including those designed so that cards are removed manually therefrom. They may also be used with card holders that have mechanical ejectors. The cage 6 shown in FIGS. 1–3 is one example of the latter type of holder. The cage 6 has an ejector for each card slot 9. Each ejector includes a first ejector lever 10 that extends along the outside surface of one side of the cage 6. The outer end of the lever 10 is provided with an actuator knob 12 that may be engaged by an operator to eject the corresponding card C from the cage 6. For example, the ejector may be operated by placing the thumb on the outer end of the knob 12 and pushing toward the rear of the cage 6 in the direction indicated by the arrow E in FIG. 2. The end of the lever 10 opposite the knob 12 is connected by a pivot 14 to one end of a second ejector lever 16. A rearward push on the knob 12 causes the second lever 16 to pivot. As the lever 16 pivots, a J-shaped engagement member 18 on its outer free end engages the inner end of the card C to push the card C along a pathway out of its engaged position in the cage 6. A pivot guide 20 guides the pivoting motion of the lever 16. The arrow P in FIG. 2 indicates the pathway along which the card C is moved from its engaged position shown in FIGS. 1 and 2 to its ejected position shown in FIG. 3. Once the card C is in the ejected position, an operator may easily grasp the outer end of the card C and pull it all the way out of the cage 6.

According to the invention, a retainer 30 is provided that has a blocking portion biased to extend into the pathway P to prevent unintentional movement of the card C along the pathway P out of the engaged position when the holder is subjected to vibrations. The preferred embodiment of the retainer 30 shown in the drawings is an integrally molded plastic member including a bracket 32 and a resilient finger 42. The bracket 32 provides a convenient means for mounting the retainer 30 to the board 2. The bracket 32 has the form of a rectangle with one open end. A fastener lug 34 is provided at each of the corners of the bracket 32. The bracket 32 is dimensioned to extend around the cage 6, as shown in FIGS. 1–3. The fastener lugs 34 and the brackets and lugs 7, 8 on the cage 6 are positioned to be aligned so that the same fasteners F secure both the cage 6 and the retainer 30 to the board 2. The bracket 32 has, in addition, two diagonally projecting arms 36 at the opposite corners of its rear end. Each arm 36 terminates in a cylindrical member 38 that has a projecting end snap fit into an additional hole in the board 2 to further stabilize the mounting of the retainer 30. As shown, a similar arm 36 and projection 38 are provided at one of the forward ends of the bracket 32 where the finger 42 of the retainer 30 is positioned.

The finger 42 is positioned on the forward end opposite the end where the knobs 12 of the ejector are located. The fastener lug 34 at the finger end has an upward (as shown) projection 40 to which a first end 46 of the main straight portion 44 of the finger 42 is integrally secured. The opposite end 48 of the finger 42 is free and carries a hook 50. The main portion 44 of the finger 42 is substantially parallel to the pathway P. The hook 50 extends laterally from the main portion 44 toward the slots 9 and then extends diagonally rearwardly toward a front corner portion of each card C. The outwardly facing diagonal surface of the hook is identified by the reference numeral 51. As shown in FIGS. 1 and 2, when the cards C are in their engaged positions, the outer end surface 52 of the hook 50 engages the corner portion of each card C.

The finger 42 is sufficiently strong to resist unintentional movement of a card C along the pathway P out of the engaged position shown in FIGS. 1 and 2 when the cage 6 is subjected to vibrations of the type experienced in vehicle and wall mountings due to operation of the vehicle or operation of machinery and other activity in the vicinity of the wall. The finger 42 is also sufficiently flexible and resilient to allow it to be deflected by intentional movement of a card C along the pathway P. In other words, the positioning of the finger 42 and its flexibility yieldably bias it into the blocking position shown in FIGS. 1 and 2. The finger 42 may be made from various materials and is currently preferably made from a flexible nylon material that provides the desired characteristics of strength, flexibility, and resilience.

In accordance with the invention, when it is desired to remove a card C from a holder, a positive force is applied to the card to move the card out of its engaged position. In the illustrated embodiment, the positive force is applied by pushing on the ejector knob 12 in the ejecting direction E. Movement of the card C out of its engaged position toward its ejected position deflects the finger 42 out of the pathway P. The arrow D in FIG. 2 illustrates the arc of the deflection. Preferably, the outer end surface 52 of the hook 50 is rounded to provide a camming action as the card C moves against the end surface 52. The corner portion of the card C is preferably very close to the edge of the card C to facilitate the camming action. Once the card C has been pulled all the way out of the cage 6, the resiliency of the finger 42 returns it to its blocking position.

Similarly, when it is desired to insert a card C into the cage 6, contact between the end of the card C and the angled surface 51 of the hook 50 at the end of the finger 42 deflects the finger 42 to permit passage of the card C into the cage 6. Once the card C is all the way in its engaged position, the resilience of the finger 42 returns it to its blocking position in which the outer end surface 52 engages the front corner portion of the card C to block unintentional movement of the card C out of its engaged position along the pathway P. As in the case of the removal of a card C, the deflecting of the finger 42 by the card C may be viewed as a camming action.

During both the removal and insertion of a card C, the presence of the retainer 30 has no effect on the procedure and in no way interferes with the removal or insertion. Thus, full ease of operation during maintenance and installation is maintained.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A device for retaining a PC card in a card holder having an ejector operable to move the card along a pathway from an engaged position to an ejected position, comprising a retainer having a blocking portion biased to move toward a blocking position in which said blocking portion extends into said pathway to prevent unintentional movement of the card along said pathway out of said engaged position when the holder is subjected to vibrations; said retainer being yieldably biased to allow said blocking portion to be deflected out of said pathway by movement of the card toward said ejected position when the ejector is operated and by movement of the card into the holder toward said engaged position;

wherein said blocking portion engages a corner portion of the card to prevent said unintentional movement of the card.

2. The device of claim 1, wherein said retainer comprises a resilient finger, and said blocking portion comprises an end portion of said finger.

3. The device of claim 2, wherein said finger includes a main portion that extends substantially parallel to said pathway and has a first end mounted adjacent to the holder and an opposite second free end, and a hook portion carried by said second end; and an outer end surface of said hook portion engages said corner portion of the card.

4. The device of claim 3, wherein said finger is formed from a flexible nylon material.

5. The device of claim 2, wherein said finger is formed from a flexible nylon material.

6. The device of claim 2, wherein the holder is mounted on a circuit board, and said finger is mounted on the board adjacent to the holder.

7. The device of claim 3, wherein the holder is mounted on a circuit board, and said first end of said finger is mounted on the board adjacent to the holder.

8. A device for retaining a PC card in a card holder having an ejector operable to move the card along a pathway from an engaged position to an ejected position, comprising a retainer having a blocking portion biased to extend into said pathway to prevent unintentional movement of the card along said pathway out of said engaged position when the holder is subjected to vibrations; said retainer being yieldably biased to allow said blocking portion to be deflected out of said pathway by movement of the card toward said ejected position when the ejector is operated and by movement of the card into the holder toward said engaged position;

wherein said blocking portion engages a corner portion of the card to prevent said unintentional movement of the card;

wherein said retainer comprises a resilient finger, and said blocking portion comprises an end portion of said finger;

wherein said finger includes a main portion that extends substantially parallel to said pathway and has a first end mounted adjacent to the holder and an opposite second free end, and a hook portion carried by said second end; and an outer end surface of said hook portion engages said corner portion of the card;

wherein the holder is mounted on a circuit board, and said first end of said finger is mounted on the board adjacent to the holder; and wherein said retainer includes a bracket that is integral with said finger, extends around the holder, and is secured to the board by a plurality of fasteners; said fasteners also securing the holder to the board.

9. A device for retaining a PC card in an engaged position in a card holder that permits movement of the card out of said engaged position along a pathway, comprising a retainer having a blocking portion biased to move toward a blocking position in which said blocking portion extends into said pathway to prevent unintentional movement of the card along said pathway out of said engaged position when the holder is subjected to vibrations; said retainer being yieldably biased to allow said blocking portion to be deflected out of said pathway by movement of the card out of said engaged position when a positive force is deliberately applied to the card to move the card and by movement of the card into the holder toward said engaged position;

wherein said blocking portion engages a corner portion of the card to prevent said unintentional movement of the card.

10. The device of claim 9, wherein said retainer comprises a resilient finger, and said blocking portion comprises an end portion of said finger.

11. The device of claim 10, wherein said finger includes a main portion that extends substantially parallel to said pathway and has a first end mounted adjacent to the holder and an opposite second free end, and a hook portion carried by said second end; and an outer end surface of said hook portion engages said corner portion of the card.

12. The device of claim 11, wherein said finger is formed from a flexible nylon material.

13. The device of claim 10, wherein said finger is formed from a flexible nylon material.

14. The device of claim 10, wherein the holder is mounted on a circuit board, and said finger is mounted on the board adjacent to the holder.

15. The device of claim 11, wherein the holder is mounted on a circuit board, and said first end of said finger is mounted on the board adjacent to the holder.

16. A device for retaining a PC card in an engaged position in a card holder that permits movement of the card out of said engaged position along a pathway, comprising a retainer having a blocking portion biased to extend into said pathway to prevent unintentional movement of the card along said pathway out of said engaged position when the holder is subjected to vibrations; said retainer being yieldably biased to allow said blocking portion to be deflected out of said pathway by movement of the card out of said engaged position when a positive force is deliberately applied to the card to move the card and by movement of the card into the holder toward said engaged position;

wherein said blocking portion engages a corner portion of the card to prevent said unintentional movement of the card;

wherein said retainer comprises a resilient finger, and said blocking portion comprises an end portion of said finger;

wherein said finger includes a main portion that extends substantially parallel to said pathway and has a first end mounted adjacent to the holder and an opposite second free end, and a hook portion carried by said second end; and an outer end surface of said hook portion engages said corner portion of the card;

wherein the holder is mounted on a circuit board, and said first end of said finger is mounted on the board adjacent to the holder; and wherein said retainer includes a bracket that is integral with said finger, extends around the holder, and is secured to the board by a plurality of fasteners; said fasteners also securing the holder to the board.

17. A method of preventing unintentional movement of a PC card along a pathway out of an engaged position in a card holder when the holder is subjected to vibrations, comprising:

yieldably biasing a blocking portion of a retainer to move toward a blocking position in which said blocking portion extends into said pathway to prevent said unintentional movement;

when removing the card from the holder is desired, applying a positive force to the card to move the card out of said engaged position and allowing movement of the card to deflect said blocking portion out of said pathway; and inserting a card into the holder, and allowing movement of the card toward said engaged position to deflect said blocking portion out of said pathway;

comprising positioning the retainer to engage a corner portion of a card in said engaged position.

18. The method of claim 17, wherein positioning the retainer comprises mounting a first end of a flexible finger adjacent to the holder, and positioning an end surface of a hook carried by an opposite second free end of the finger to engage said corner portion.

* * * * *